(12) United States Patent
Taunton et al.

(10) Patent No.: US 6,601,157 B1
(45) Date of Patent: Jul. 29, 2003

(54) REGISTER ADDRESSING

(75) Inventors: Mark Taunton, Cambridgeshire (GB);
Sophie Wilson, Cambridgeshire (GB);
Timothy Martin Dobson, Cambridge (GB)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 09/703,837

(22) Filed: Nov. 1, 2000

(30) Foreign Application Priority Data

Jun. 20, 2000 (GB) ............................................. 0015092

(51) Int. Cl.[7] ............................................. G06F 12/00
(52) U.S. Cl. ..................... 711/219; 711/217; 711/218; 712/20; 712/21; 712/22
(58) Field of Search ................................ 711/219, 217, 711/218, 214, 215; 712/20, 22

(56) References Cited

U.S. PATENT DOCUMENTS

| | | | | |
|---|---|---|---|---|
| 5,390,307 A | * | 2/1995 | Yoshida ........................ | 712/225 |
| 5,390,358 A | | 2/1995 | Sugino ......................... | 395/800 |
| 5,488,730 A | | 1/1996 | Brown, III et al. ........... | 395/800 |
| 5,924,114 A | * | 7/1999 | Maruyama et al. .......... | 711/110 |
| 5,963,746 A | * | 10/1999 | Barker et al. ................. | 712/20 |
| 6,205,543 B1 | * | 3/2001 | Tremblay et al. ............ | 712/228 |
| 6,260,137 B1 | * | 7/2001 | Fleck et al. .................. | 712/225 |
| 6,446,190 B1 | * | 9/2002 | Barry et al. .................. | 712/24 |
| 6,487,651 B1 | * | 11/2002 | Jackson et al. ............... | 712/13 |

FOREIGN PATENT DOCUMENTS

| | | | | |
|---|---|---|---|---|
| EP | 0 380 849 A3 | 8/1990 | ............. | G06F/9/30 |
| EP | 0 483 967 A3 | 5/1992 | ............. | G06F/9/30 |
| EP | 0 483 967 A2 | 5/1992 | ............. | G06F/9/30 |

* cited by examiner

*Primary Examiner*—Do Hyun Yoo
*Assistant Examiner*—Ngoc V Dinh
(74) *Attorney, Agent, or Firm*—Darby & Darby

(57) ABSTRACT

There is disclosed a technique for accessing a register file which comprises defining a first register address as a plurality of bits and using said first register address to access said register file generating a second register address by using a sequence of said plurality of bits with at least one of said plurality of bits supplied via a unitary operator, the unitary operator being effective to selectively alter the logical value of said bit depending on its logical value in the first register address, and using said second register address to access said register file. A computer system for carrying out such a technique is also enclosed.

9 Claims, 4 Drawing Sheets

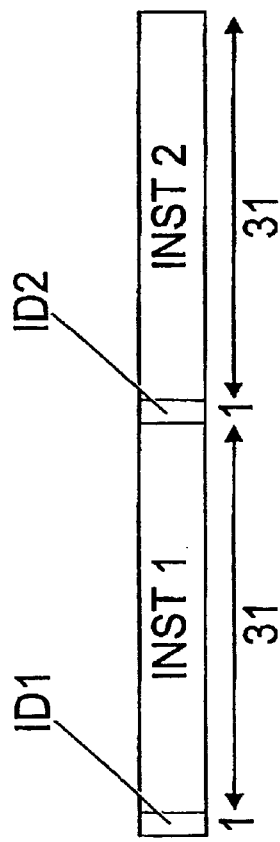

REGISTER ADDRESSING

FIELD OF THE INVENTION

The present invention relates to a register addressing technique particularly but not exclusively designed to facilitate register accesses in a processor. The invention also relates to a computer system in which register addresses are generated.

BACKGROUND OF THE INVENTION

In computer systems it is conventional to define in each instruction to be executed a set of register addresses which are used to access a register file in the computer system. The register addresses normally include first and second source register addresses defining registers from which operands are extracted and at least one destination register address defining a register into which the results of an operation are loaded. Data processing instructions generally use the contents of the first and second source registers in some defined mathematical or logical manipulation and load the results of that manipulation into the defined destination register. Memory access instructions use the register addresses to define memory locations for loading and storing data to and from a data memory. In a load instruction, the source registers define a memory location from which data is to be loaded into the destination register. In a store instruction, the source registers define a memory location into which data is to be stored from the destination register.

Some computer systems have more than one execution channel. In such computer systems, each execution channel has a number of functional units which can operate independently. Both execution channels can be in use simultaneously. Sometimes, the execution channels share a common register file. It is useful in such architectures to provide instructions which simultaneously instruct both execution channels to implement a function so as to speed up operation of the processor. In such a scenario, a so-called long instruction may have two instruction portions each intended for a particular execution channel. Each instruction portion needs to define the register addresses for use in the function to be performed by the execution channel for which it is intended. In some cases both instruction portions may wish to define associated or the same register addresses. In these situations a long instruction needs to define two sets of register addresses, one for each execution channel.

It is an aim of the present invention to reduce the number of bits required in an instruction for accessing a register file, in particular in the context of multiple execution channels in a computer system.

SUMMARY OF INVENTION

According to one aspect of the present invention there is provided a computer system comprising: a decode unit for decoding instructions supplied to the decode unit from a program memory, wherein each instruction has at least one bit sequence defining a register address; a register file having a plurality of registers each having the same predetermined bit capacity and addressable via at least two register address ports, one of said ports being associated with a first execution channel of the computer system and the other of said ports being associated with the second execution channel of the computer system; a first register address supply path for supplying said at least one bit sequence in the instruction to said one register address port; and a second register address path for supplying the bit sequence in the instruction to said other register address port via a unitary operator which selectively alters the logical value of at least one bit in the register address dependent on the logical value of said at least one bit.

According to another aspect of the invention there is provided a method of accessing a register file, the method comprising: defining a first register address as a plurality of bits and using said first register address to access said register file; generating a second register address by using a sequence of said plurality of bits with at least one of said plurality of bits supplied via a unitary operator, the unitary operator being effective to selectively alter the logical value of said bit depending on its logical value in the first register address, and using said second register address to access said register file.

That is, in one embodiment, if the LSB (least significant bit) of the sequence is a "zero", it is changed to a "one" by the unitary operator, but if it is a one, it remains unchanged. Thus, the bit sequence ending in a "zero" generates an even/odd pair of register addresses and the bit sequence ending in a "one" generates an odd/odd pair.

BRIEF DESCRIPTION OF THE FIGURES

For a better understanding of the present invention and to show how the same may be carried into effect reference will now be made by way of example to the accompanying drawings in which:

FIG. 5 is a diagram illustrating the encoding of two "packed" instructions;

FIG. 6 illustrates a number of different instruction formats; and

DESCRIPTION OF THE PREFERRED EMBODIMENT

Figure 1:
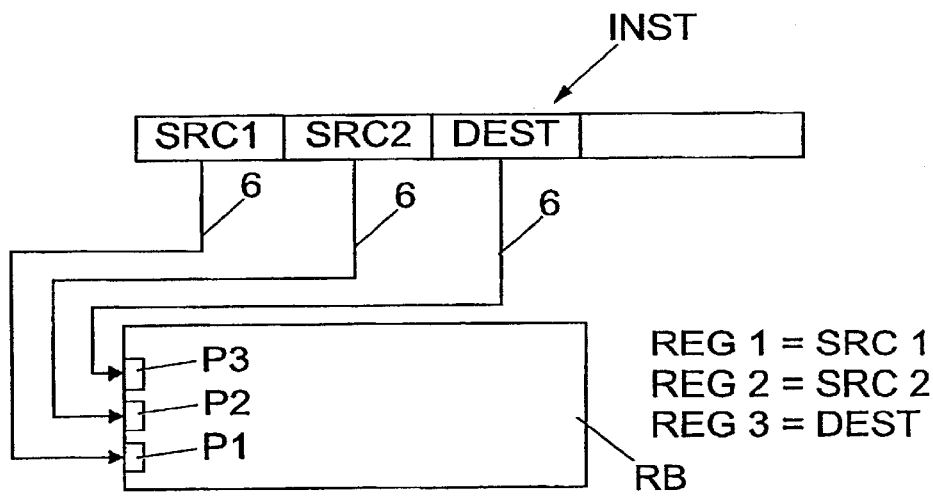
FIG. 1 is a schematic diagram illustrating a known register access system.

Before describing a particular implementation, the concept underlying the present invention will first be discussed with reference to FIGS. 1 to 3. FIG. 1 illustrates an instruction INST which has a number of fields more fully discussed in the following. These fields include three register addressing fields which are labelled SRC1, SRC2 and DEST in FIG. 1 to denote the fact that they are intended to address first and second source registers and a destination register respectively. In the described embodiment each field is a bit sequence having a length of six bits. FIG. 1 illustrates schematically the known situation where each register address is supplied to respective address ports P1 to P3 respectively of a register bank RB to address the required registers. The manner in which this is done is known to a person skilled in the art and is not discussed further herein. What is important to note however is that each address port P1 to P3 of the register bank RB receives a six bit address, and each address field has a length of six bits. It is assumed in FIG. 1 that a first register REG1 will be addressed by the first source register address SRC1, and second register REG2 will be addressed by the second source register address SRC2 and a third register REG3 will be addressed by the destination address DEST.

Figure 2:
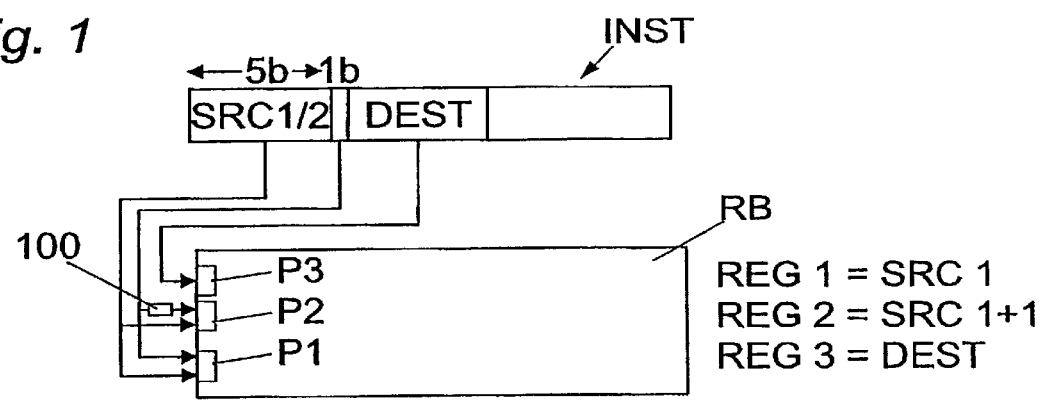
FIG. 2 is a schematic diagram illustrating the concept underlying the present invention.
Figure 3:
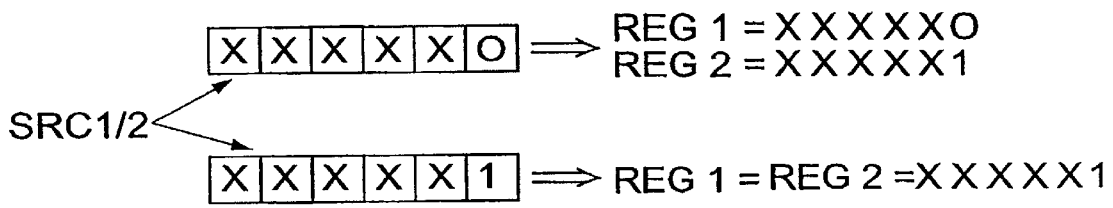
FIG. 3 illustrates the effect of a unitary operator.

FIG. 2 illustrates the concept underlying the present invention. FIG. 2 also illustrates an instruction INST which is capable of addressing three registers in a register bank RB. However, in this case a single six bit long addressing field labelled SRC1/2 allows two source registers to be addressed as a pair. Such registers will be referred to in the following as paired registers. This is achieved by supplying five bits of the source register address field SRC1/2 in common to addressing ports P1, P2. The sixth bit of the register addressing field SRC1/2 is supplied directly to the addressing port P1 and via a unitary operator 100 to the addressing port P2. The unitary operator 100 has the following effect as illustrated in FIG. 3. When the sixth bit is a zero, the unitary operator 100 forces that bit to a one. Therefore, the register addressing field SRC1/2 addresses a first register REG1 which is an evenly numbered register and a second register REG2 which is the next odd number up. This is referred to as an even/odd pair.

When the sixth bit supplied via the unitary operator 100 is a one, no change is made. In this situation the register addressing field SRC1/2 defines a single address which is used to generate two register accessing addresses which are the same. This is referred to as an odd/odd pair.

Before discussing further the usefulness of such a concept, it is pointed out that the unitary operator could have exactly the same effect with addresses of opposite binary semantics. That is, it could be the case that if the sixth bit is a one and is supplied to the unitary operator, it is changed to a zero and if the sixth bit is a zero and is supplied to the unitary operator it remains a zero. This would result in the possibility of addressing a so-called odd/even pair or an even/even pair. Moreover, it is quite possible to implement a situation where the unitary operator acts on more than one bit to provide, for example, the possibility of addressing a pair of registers spaced apart by a predetermined amount. Furthermore, while the following description relates to a situation where the sixth bit is the lowest significant bit of the address field, it will equally be appreciated that one or more of the most significant bits could be treated in the same way to provide different pairings of registers.

In each case however note that the effect of the unitary operator is to provide the possibility for addressing a pair of different registers or generating the same register address twice.

There will now be described an application of this concept in a computer system.

Figure 4:
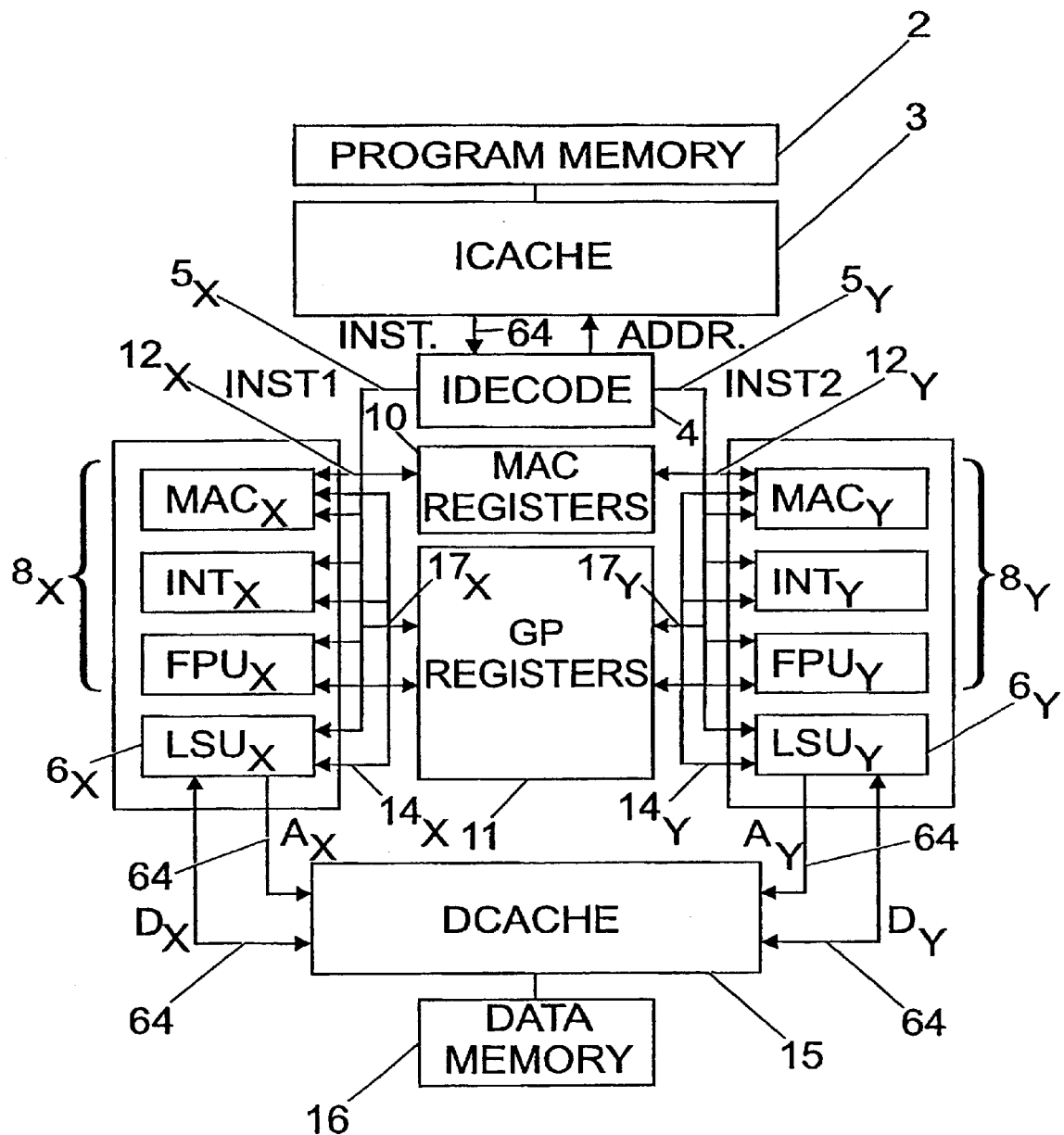
FIG. 4 is a schematic block diagram of a processor.

The computer system described herein is a dual instruction stream, multiple data (DIMD) stream machine which normally executes two "instructions" every cycle. FIG. 4 is a schematic diagram of the system. In FIG. 4, reference numeral 2 denotes a program memory which holds programs in the form of a plurality of instructions. In the normal mode of operation, each 64 bit instruction in the program memory allows two 31 bit operations to be defined in the manner illustrated in FIG. 5. That is, each 64 bit instruction contains two 31 bit instruction portions labelled INST1 and INST2. Each instruction portion has associated with it a single bit which identifies the type of instruction. These are denoted ID1 and ID2 in FIG. 5, standing for identification bits. An instruction portion can identify a data processing (DP) operation or a load/store (LD/ST) operation as will be explained more fully hereinafter. The allowed combinations are two data processing operations (ID1, ID2 both set to "0"), two load/store operations (ID1, 1D2 both set to "1") or one data processing and one load store operation (ID1=0, ID2=1). FIG. 6 illustrates some of the basic instruction formats for the 31 bit instruction portions, with M denoting the identification bit. In the following, the word "instruction" is used to denote the 32 bit sequence M plus the instruction portion because they are treated as instructions by each side of the DIMD machine.

Reverting to FIG. 4, the program memory 2 is connected to an instruction cache 3 which is connected to instruction fetch/decode circuitry 4. The fetch/decode circuitry issues addresses to the program memory and receives 64 bit lines from the program memory 2 (or cache 3), evaluates the opcode and transmits the respective instructions INST1, INST2 along X and Y channels $5_x$, $5_y$. Each channel comprises a SIMD execution unit $8_x$, $8_y$ which includes three data processing units, MAC, INT and FPU and a load/store unit LSU 6. Each data processing unit MAC, INT and FPU and the load/store units LSU operate on a single instruction multiple data (SIMD) principle according to the SIMD lane expressed in the instruction according to the following protocol which defines the degree of packing of objects for packed data processing operations:

(B)—8 bit objects ($b_0 \ldots b_7$)
(H)—16 bit objects ($h_0 \ldots h_3$)
(W)—32 bit objects ($w_0 \ldots w_1$)
(L)—64 bit objects (I)
(S)—32 bit floating point
(D)—64 bit floating point For each channel $5_x$, $5_y$ if the instruction is a data processing instruction it is supplied to the appropriate data processing unit MAC, INT or FPU and if it is a load/store instruction it is supplied to the load/store unit LSU. Data values are loaded to and from the MAC data processing units into and out of a common register file 10 which includes sixteen 64 bit special purpose registers along register access paths $12_x$, $12_y$. Data values are loaded to and from the INT and FPU data processing units and the load/store units LSU into and out of a second register file 11 which includes sixty-four 64-bit general purpose registers. Register access paths $14_x$, $14_y$ are provided for these accesses. The program counter PC which indicates the current instruction can be read via one of the general purpose registers. Another one of the general purpose registers constitutes a control and status register.

Each register access path $17_x$, $17_y$ carries three addresses from the accessing unit, two source addresses SRC1, SRC2 and a destination address DST. In the case of data processing instructions, the source addresses SRC1, SRC2 define registers in the register files 10, 11 which hold source operands for processing by the data processing unit. The destination address DST identifies a destination register into which a result of data processing will be placed. See instruction formats (1) to (5) in FIG. 6. The operands and results are conveyed between the register file 10 or 11 and the respective data processing unit via the access paths $17_x$, $17_y$. In the case of load/store instructions, the instruction formats allow memory access addresses $A_x$, $A_y$ to be formulated from data values held in the registers as described later. The load store units access a common address space in the form of a data memory 16 via a dual ported data cache DCACHE 15. For this purpose, each load/store unit has a 64 bit data bus Dx, Dy and a 64 bit address bus Ax, Ay. Each load/store unit $6_x$, $6_y$ can execute a number of different memory access (load/store) instructions, implemented in formats (6) and (7) in FIG. 6.

According to a first class of memory access instructions, an object is loaded into a destination register specified in the instruction (in the DST field) from an address read from a source register in the instruction (in the BASE REG field). The length of the object depends on the SIMD lane B, H, W or L specified in the instruction opcode. If the object length is less than 64 bits, the upper bits of the destination register are filled with zeros. This class of instruction also allows the number of objects to be specified. The memory address is read from the source register in the register file 11 by the specified load/store unit $6_x$, $6_y$ and despatched to the cache 15 via the appropriate address bus $A_x$, $A_y$. The object or objects are returned along the data bus Dx or Dy and loaded into the destination register of the register file 10 by the load/store unit. As is well known, on a cache miss, an access to the data memory 16 may be needed.

For each of the load instructions in the first class, there are matching store instructions. In each case, a single address is sent by each load/store unit and a single data value is returned at that address. That data value can constitute a number of objects depending on the number specified in the instruction and the length specified in the SIMD lane of the instruction.

One such load instruction allows two long words to be loaded from two adjacent addresses in the data memory 16 into successive destination registers from a base address in a first source register with an offset given in a second source register.

Figure 7:
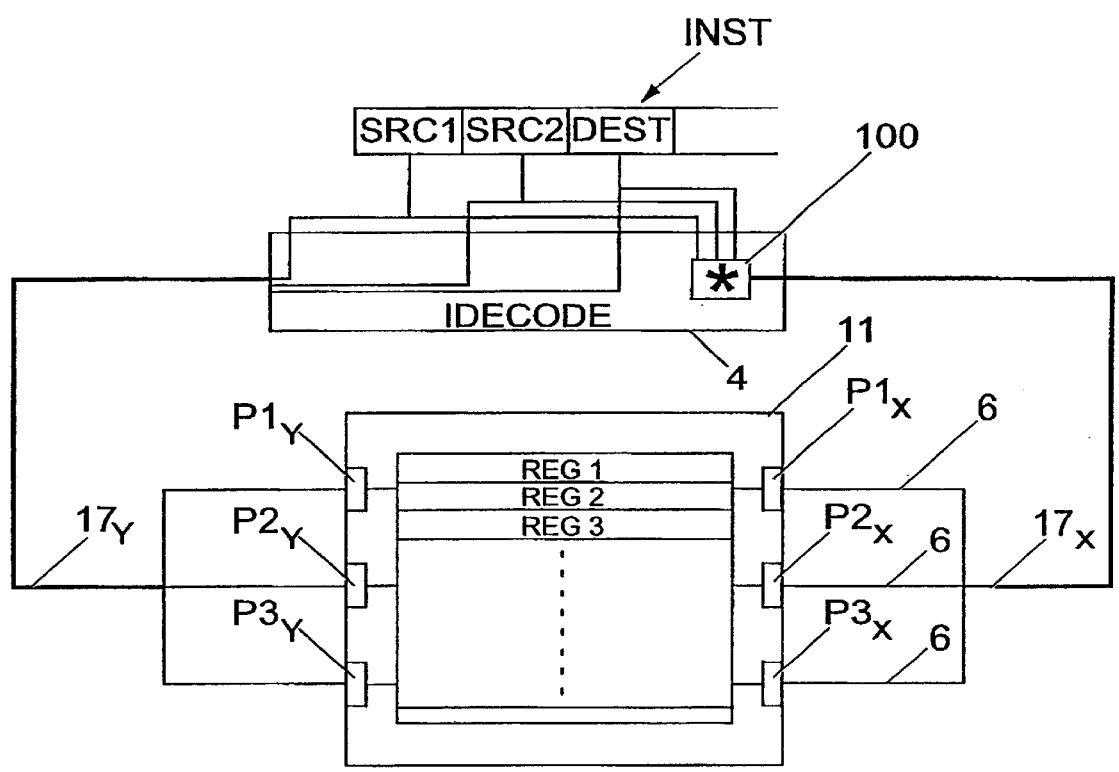
FIG. 7 is a schematic diagram illustrating one implementation of the present invention.

The general purpose register file 11 is more clearly illustrated in FIG. 7. The general purpose register file 11 has two sets of addressing ports, one on the Y side $P1_y$, $P2_y$, $P3_y$ and one on the X side $P1_x$, $P2_x$, $P3_x$. Each of these addressing ports is capable of receiving a six bit address for identifying one of a plurality of registers REG1, REG2, REG3 etc. In the computer system just described, each instruction portion INST1, INST2 has fields providing three addresses to the general purpose register file 11. Using the concepts described above with reference to FIGS. 2 and 3, the code density for instructions can be significantly reduced by using only three address fields in a 64 bit instruction to identify six register addresses for use by both instruction portions INST1, INST2. This is achieve by inserting a unitary operator 100 on the X side of the machine. In FIG. 7, the unitary operator 100 is shown as being inserted in the decode circuit but it could be implemented in any convenient part of the computer system. It can be implemented by merely hard-wiring the sixth address bit of each address line from the address fields in the instruction as a one. It will be appreciated from the description given earlier in relation to FIGS. 2 and 3, that this arrangement allows six addresses to be generated from three register address fields with the following relationship.

Each register address field can address the same register or paired registers as defined above. If the same register address is generated, it will be used to address that register from different sides of the machine in accordance with the operational requirement of the instruction INST1 or INST2 being effected on that side of the machine.

FIG. 7 illustrates a general case. It will readily be appreciated that significant advantages may still be had for certain implementations by supplying only one of the address fields through a unitary operator 100 while the other address fields are wired to respective register address ports.

What is claimed is:

1. A computer system comprising:
    a decode unit for decoding instructions supplied to the decode unit from a program memory, wherein each instruction has at least one bit sequence defining a register address;
    a register file having a plurality of registers each having the same predetermined bit capacity and addressable via at least two register address ports, one of said ports being associated with a first execution channel of the computer system and the other of said ports being associated with a second execution channel of the computer system;
    a first register address supply path for supplying said at least one bit sequence in the instruction to said one register address port; and
    a second register address supply path for supplying the bit sequence in the instruction to said other register address port via a unitary operator which selectively alters the logical value of at least one bit in the register address from the instruction dependent on the logical value of said at least one bit.

2. A computer system according to claim 1, wherein each instruction defines three register address defining bit sequences defining for each channel first and second source register addresses and a destination register address, wherein the register file has three register address ports associated with each execution channel of the computer system.

3. A computer system according to claim 1, wherein the unitary operator is effective to change the value of the least significant bit of the bit sequence from a zero to a one, but to leave the least significant bit unchanged if it is already a one.

4. A computer system according to claim 1, wherein the unitary operator is effective to change the value of the least significant bit of the bit sequence from a one to a zero, but to leave the least significant bit unchanged if it is already a zero.

5. A computer system according to claim 1, wherein each execution channel includes at least one functional unit for effecting a function defined in the instruction, said execution channels being operable independently or together.

6. A computer system according to claim 1, wherein the unitary operator is located within the decode unit.

7. A method of accessing a register file, the method comprising:
    defining a first register address as a plurality of bits in an instruction and using said first register address to access said register file via a first register address port;
    generating a second register address from said first register address by using a sequence of said plurality of bits with at least one of said plurality of bits supplied via a unitary operator, the unitary operator being effective to selectively alter the logical value of said at least one bit depending on its logical value in the first register address, and using said second register address to access said register file via a second register address port.

8. A method according to claim 7, wherein the unitary operator is effective to alter a logical zero value of said at least one bit to a logical one, but to leave a logical one value unaltered.

9. A method according to claim 7, wherein the unitary operator is effective to alter a logical one value of said at least one bit to a logical zero, but to leave a logical zero value unaltered.

* * * * *

UNITED STATES PATENT AND TRADEMARK OFFICE
CERTIFICATE OF CORRECTION

PATENT NO. : 6,601,157 B1
DATED : July 29, 2003
INVENTOR(S) : Taunton et al.

It is certified that error appears in the above-identified patent and that said Letters Patent is hereby corrected as shown below:

Title page,
Item [56], References Cited, U.S. PATENT DOCUMENTS, insert:
-- 5,881,312 --.

Signed and Sealed this

Seventeenth Day of January, 2006

JON W. DUDAS
*Director of the United States Patent and Trademark Office*